(12) United States Patent
Ravichandran

(10) Patent No.: US 11,729,674 B2
(45) Date of Patent: *Aug. 15, 2023

(54) CHANGING RADIO ACCESS TECHNOLOGIES TO CONNECT TO A NETWORK

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/038,747

(22) Filed: Sep. 30, 2020

(65) Prior Publication Data

US 2021/0014740 A1 Jan. 14, 2021

Related U.S. Application Data

(63) Continuation of application No. 16/209,829, filed on Dec. 4, 2018, now Pat. No. 10,813,009.

(51) Int. Cl.
*H04W 36/00* (2009.01)
*H04W 36/18* (2009.01)
*H04W 68/00* (2009.01)

(52) U.S. Cl.
CPC ....... *H04W 36/0022* (2013.01); *H04W 36/18* (2013.01); *H04W 68/00* (2013.01)

(58) Field of Classification Search
CPC .. H04W 36/0022; H04W 36/18; H04W 68/00
See application file for complete search history.

(56) References Cited

U.S. PATENT DOCUMENTS 8,861,692 B1 * 10/2014 Phelps ................. H04M 15/39
379/121.01
10,813,009 B2 * 10/2020 Ravichandran ... H04W 36/0022
(Continued)

OTHER PUBLICATIONS

Office Action for U.S. Appl. No. 16/209,829, Ravichandran, "Changing Radio Access Technologies to Connect to a Network", 12 pages.

*Primary Examiner* — Brenda H Pham
(74) *Attorney, Agent, or Firm* — Lee & Hayes, P.C.

(57) ABSTRACT

A light-weight solution for media handovers between different Radio Access Technologies (RAT) is provided. A user may switch from Wi-Fi to Cellular Data (e.g., LTE/4G/3G/ . . . ), from Cellular data to Wi-Fi, and the like. In contrast to a "make-before-break" design for switching between RATs, the technologies described herein are a "break-before-make" design. When a change in a RAT is detected, an application on the computing device utilizing the connection is notified of the change. Instead of removing connection information, the connection is maintained for a configurable period of time such that the application can re-register with the network to continue the communication session. During a transition to a second RAT, the application provides one or more notifications to the user of the change in RAT. For instance, a graphical user interface (GUI) can be displayed showing the change and/or a tone can be played indicating the change in the RAT.

20 Claims, 5 Drawing Sheets

(56) References Cited

U.S. PATENT DOCUMENTS

| | | | |
|---|---|---|---|
| 2011/0182240 A1* | 7/2011 | Kanauchi | H04W 48/16 370/328 |
| 2013/0237223 A1* | 9/2013 | Hietalahti | H04W 48/18 455/435.1 |
| 2015/0119034 A1* | 4/2015 | Li | H04W 28/08 455/435.2 |
| 2018/0227699 A1* | 8/2018 | Kim | H04W 8/02 |
| 2020/0178127 A1 | 6/2020 | Ravichandran | |

* cited by examiner

CHANGING RADIO ACCESS TECHNOLOGIES TO CONNECT TO A NETWORK

CROSS-REFERENCE TO RELATED APPLICATION

This application is a continuation of and claims priority to U.S. application Ser. No. 16/209,829, filed on Dec. 4, 2018 and entitled "Changing Radio Access Technologies to Connect to a Network," the entirety of which is incorporated herein by reference.

BACKGROUND

Mobile networks are expanding rapidly. For example, not only are 4G-LTE networks expanding, wireless service providers are starting to deploy 5G networks. As these networks expand and provide more bandwidth at higher speeds, real time communication (RTC) between computing devices is becoming more typical. For example, there are applications that allow users to video chat, share media, and the like. When a user switches from one type of radio access technology (RAT) to another type of RAT (e.g., Wi-Fi to 4G-LTE), the communication between applications can be interrupted. This interruption can be disruptive to the communication session.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Described herein are techniques and systems for changing radio access technologies to connect to a network. Using techniques described herein, a light-weight solution for media handovers between different Radio Access Technologies (RAT) is provided. For example, a user may switch from Wi-Fi to Cellular Data (e.g., LTE/4G/3G/ . . . ), Cellular data to Wi-Fi, and the like using the technologies described. Generally, a RAT is the underlying physical connection method for a radio-based communication network, such as utilized within a network associated with a wireless service provider. Many computing devices (e.g., mobile phones) support several RATs (e.g., Wi-Fi, and 3G, 4G, LTE, 5G).

In contrast to a "make-before-break" design that may be utilized for switching between RATs, the technologies described herein describe a "break-before-make" design. The "break-before-make" system described herein is a more light-weight solution (e.g., using fewer computational resources and/or communication bandwidth) as compared to a "make-before-break" solution. According to some configurations, when a change in a RAT is detected, an application on the computing device utilizing the connection is notified of the change. Instead of the network removing the connection data associated with the application upon detecting the loss of connectivity with the network, connection data associated with the computing device is maintained by the network for a configurable period of time. During this time, the application can request to re-register for a second connection such that the media used by the application can continue using the second connection that is associated with the new RAT.

According to some examples, one or more notifications are provided by the computing device to indicate the change in the RAT the application and/or to the user of the computing device. For instance, a graphical user interface (GUI) can be displayed showing the change and/or a tone can be played indicating the change in the RAT. As an example, if a first user is connected to a network via Wi-Fi and is on a call with a second user, then when the first user moves away from Wi-Fi (e.g., loses connection to the Wi-Fi), there is a break in the connection and a change in RAT. At this time, the application and/or the user can be presented with a user interface and/or notification indicating the break in the connection and the move to the new RAT (e.g., Wi-Fi to 5G, 4G to 5G). The application is notified of the break in connection such that the application has time to re-register such that the application is connected using the new RAT. As such, the user is informed that the connection is re-establishing with a different RAT. More details are provided below with regard to FIGS. 1-5.

Figure 1:
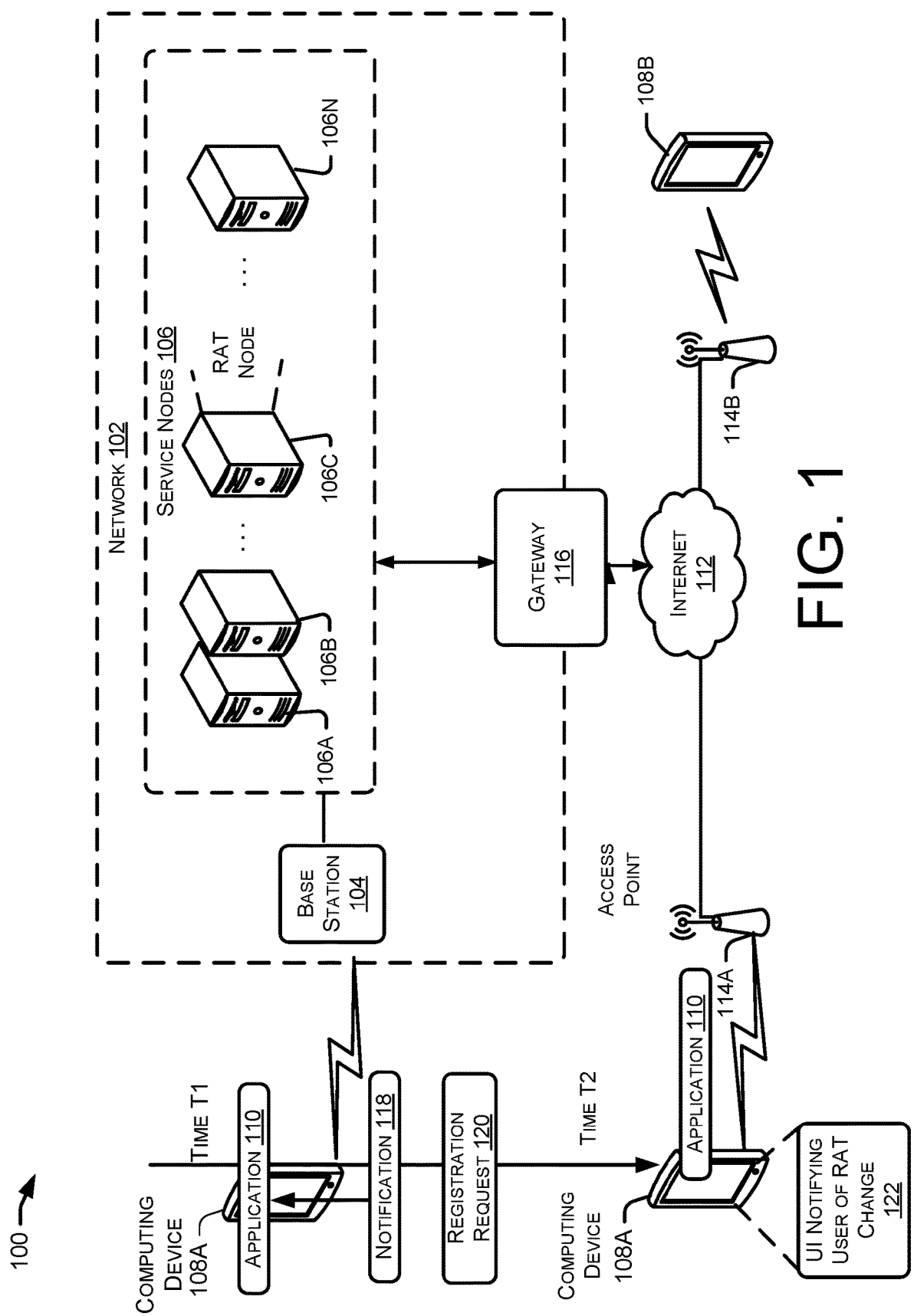
FIG. 1 is a block diagram showing an illustrative environment for changing radio access technologies to connect to a network associated with a wireless service provider.

FIG. 1 is a block diagram showing an illustrative environment 100 for changing radio access technologies to connect to a network associated with a wireless service provider. The environment 100 may include a network 102 that is operated by a wireless service provider. The environment 100 is illustrated in simplified form and may include many more components.

The network 102 may include one or more base stations 104 and one or more service nodes 106. A base station 104 may handle traffic and signals between electronic devices, such as the computing devices 108A and 108B, and a core network of the network 102. For example, the base station 104 may perform the transcoding of speech channels, allocation of radio channels to electronic device, paging, transmission and reception of voice and data, as well as other functions. The base station 104 may include several base transceiver stations (BTS), each BTS may include a transceiver, antenna, and additional network switch and control equipment that provide a network cell for facilitating wireless communication between computing devices and the core network of the network 102. In some examples, the base station 104 can include an eNodeB and/or a gNodeB.

The network 102 may be responsible for routing voice communication(s) to other networks, as well as routing data communication(s) to external packet switched networks, such as the Internet. For example, the one or more service nodes 106 may be a Gateway GPRS Support Node (GGSN) or another equivalent node. According to some configurations, the one or more service nodes includes a node configured to perform operations relating to RATs. One or more of the service nodes 106A can also be configured as a Policy and Charging Rules Function (PCRF) node that utilized to enforce policy rules of the network, or some other type of node.

The RAT node 106C can be configured to perform operations as described herein relating to a computing device, such as the computing device 108A changing from a cellular (e.g., 4G-LTE, 5G, . . . ) to Wi-Fi, from Wi-Fi to another RAT, and the like. In some examples, the computing device 108A may temporarily lose connection to one RAT, and then re-establish connection to the same RAT. More details are provided below. The PCRF node can be configured to automatically make policy decisions for each subscriber active on the network. For example, the PCRF may be utilized to allocate bandwidth of the network as well as provide different levels of service to different computing devices on the network. Additionally, some data can be prioritized within the network.

The computing devices 108A and 108B may be a smart phone, a personal digital assistant, a netbook, a laptop computer, and/or another electronic that is capable of sending and/or receiving voice or data via the network 102 and/or a Wi-Fi network.

In some configurations, one or more of the service nodes 106 may be configured as one or more application servers that provide support for one more applications, such as application 110. While the service nodes 106 are illustrated within the network 102, one or more other computing devices may be located outside of the network 102. For example, an application server, or some other server or device, may be connected to the network 102 via one or more external packet switched networks, such as the Internet.

According to some configurations, a telephony client application, such as application 110, on the computing device 108 may establish data communication with the network 102 through a data connection to the base station 104. The base station 104 may route a communication from the communication device 108 through the core network via the service nodes 106. In such instances, the service nodes 106 may be capable of performing subscriber profile insertion with respect to data traffic between the application 110 on the computing device 108 and the application server. For example, the application 110 may be an application that sends data to another computing device, such as to computing device 108B.

When a communication request arrives at the network 102, one or more of the service nodes 106 may determine the originating number for the communication as well as the computing devices to send the communication. According to some configurations, the application 110 on the computing device 108 may connect to the service nodes 106, or some other component such as an application server, via the Internet 112. In such instances, the application 110 may connect to the Internet 112 via Wi-Fi access point 114A. Accordingly, data traffic from the application 110 may be routed to the service nodes 106 by the gateway 116 of the network 102. Similarly, device 108B may connect to the Internet 112 via access point 114B.

In either case, the computing device 108, such as the computing device 108a, requests to make a communication with a destination number associated with one or more computing devices. The network 102 receives the request and, in some cases, may authenticate the user and/or the computing device. For example, the service nodes 106 may authenticate the computing device 108. In some cases, the service nodes 106 may query a database, or some other data store or memory, to determine the originating number and the computing devices associated with the requested destination number.

In some configurations, the RAT node 106C is configured to provide functionality associated with the switching of a first RAT used by a computing device to connect to at time T1 to a second RAT used by the computing device at time T2 to connect to the network 102. As illustrated in FIG. 1, computing device 108A is utilizing a first RAT at time T1, and at time T2 transitions to a second RAT to connect to the network 102. For example, a user associated with computing device 108A may switch from Cellular Data (e.g., LTE/4G/3G/ . . . ), to Wi-Fi data. As briefly discussed above, computing devices 108 may support several RATs (e.g., Wi-Fi, and 3G, 4G, LTE, 5G).

In contrast to a "make-before-break" design for switching between RATs (or re-establishing connection to a same RAT), the technologies described herein describe a "break-before-make" design. The "break-before-make" system described herein is a more light-weight solution as compared to a "make-before-break" solution. According to some configurations, when a change in a RAT by a computing device 108 connected to the network 102 is detected, the application 110 is notified of the change. For example, a component on computing device 108A may notify the application 110 of the change in the RAT.

Instead of immediately terminating the connection to the application 110 upon detecting that the computing device 108A is no longer connected to the network 102 (e.g., due to the RAT change), connection data associated with the connection to the computing device 108A is maintained for a configurable period of time. For example, the RAT node 106C may maintain connection data for the registration request associated with the first RAT. During this time the connection data is maintained, the application 110 can re-register to request a new second connection utilizing a different (i.e. second) RAT (or in some cases, re-establishing a connection with the same RAT) such that the media use by the application 110 can continue.

Figure 2:
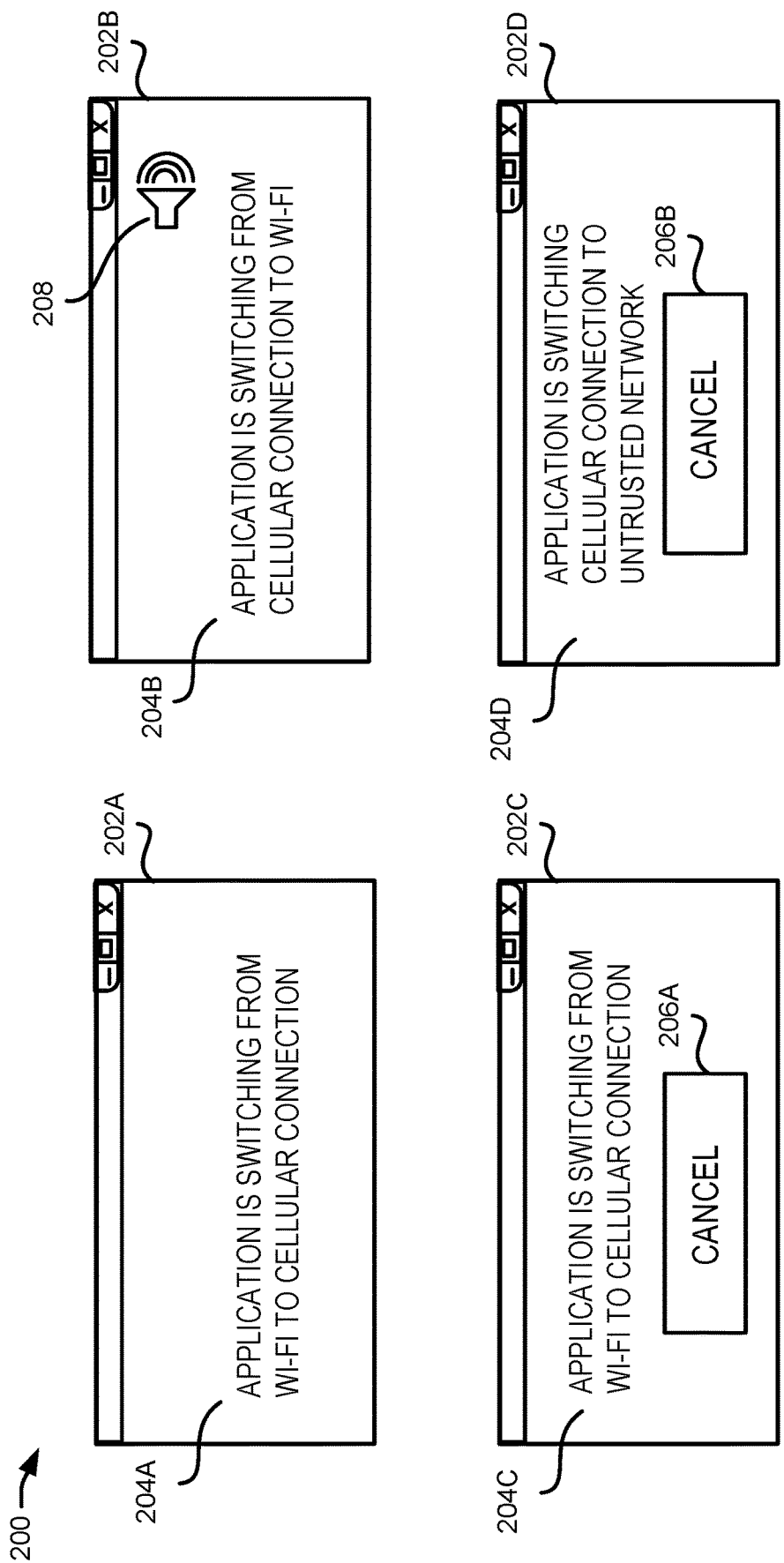
FIG. 2 are screen diagrams showing illustrative graphical user interfaces that display data relating to providing an indication that the device is switching to a different radio access technology.

According to some examples, one or more notifications are provided via the UI 122 by the computing device 108A to indicate the change in RAT to the user of the computing device. For instance, a graphical user interface (GUI) 122 can be displayed showing the change and/or a tone can be played indicating the change in the RAT. Providing one or more notifications of the change allows the user of the computing device to identify a break in connection for the application. For example, if a user is using a video application to communicate with another video application, and the connection changes from a cellular connection to Wi-Fi, the user will know that any delay is caused by the change in the RAT. FIG. 2 shows illustrative user interfaces and notifications that can be provided to indicate the change in RAT to the user associated with the computing device 108.

In the example illustrated in FIG. 1, a user is connected to a network via a cellular connection and is on a call with second user. When then user moves within range of a Wi-Fi network, there may be a break in the cellular connection and a change in the RAT. Upon detecting the change in the RAT, the computing device 108A provides a display (e.g., on the screen of computing device 108A) indicating the break in the connection and the move to the new RAT (e.g., 4G-LTE to Wi-Fi). The application 110 is also notified of the break in connection such that the application 110 has time to re-register with the network 102 and the application is connected to the network 102 using the new RAT. In some configurations, a component of computing device 108A provides the notification. If the application was not notified of the change in the RAT, the connection with the mobile network 102 would terminate and the application 110 may not readily be able to determine the cause of the termination of the connection. Notifying the application of the change in the RAT allows the application 110 to decide as to whether to send a registration request 120 associated with the connection to the new RAT, or not. Once the application 110 has received the notification, the application 110 can also inform the user that the connection is re-establishing with the same or a different RAT.

According to some configurations, WebRTC-based sockets are used for connections between different applications 110 and computing devices 108. In some examples, the application 110 receives a session description from a browser (or some other application) and then communicates with the other applications connected to network 102 using peer-to-peer communication.

FIG. 2 illustrates screen diagrams 200 showing example graphical UIs 202A-202D that display data relating to providing an indication that the device is switching to a different RAT. The UIs 202A-202D may be generated by the application 110, shown in FIG. 1, or by some other computing device (e.g., one or more service nodes 106 within network 102) or some other component or computing device. In some configurations, the UIs 204 are presented on a computing device, such as the computing device 108A, by an application, such as application 110, or a web browser application.

As illustrated in FIG. 2, the UIs 202A-202D include a display of the message 204A-204D indicating the change in the RAT. In the current examples, the message 204A displayed within UI 202A indicates that the application 110 is switching from a Wi-Fi connection to a cellular connection (e.g., 4G-LTE, 5G, . . . ). The messages 204A-204D are merely illustrative and can be any type of message or indication that notifies a user of the change in networks.

The message 204B displayed within UI 202B indicates that the application 110 is switching from a cellular connection to a Wi-Fi connection. As discussed above, in some configurations, a sound (or some other type of notification) can also be presented to a user. In the current example, one or more sounds are output as indicated by element 208. The sounds may be one or more tones, a voice message, and the like.

The message 204C displayed within UI 202C indicates that the application 110 is switching from a Wi-Fi connection to a cellular connection (e.g., 4G-LTE, 5G, . . . ). As illustrated, the UI 202C includes a selectable UI element 206A that allows a user to indicate not to switch to a cellular connection (or some other type of network). For example, the user may not desire to switch due to security concerns, cost, and the like.

The message 204D displayed within UI 202D indicates that the application 110 is switching from a cellular connection (e.g., 4G-LTE, 5G, . . . ) to an untrusted network. For instance, the new connection may be a public Wi-Fi that may not provide the security desired by the user. As illustrated, the UI 202D includes a selectable UI element 206A that allows a user to indicate not to switch to the untrusted network. Many other types of UIs can be provided to indicate the change in the RAT.

Figure 3:
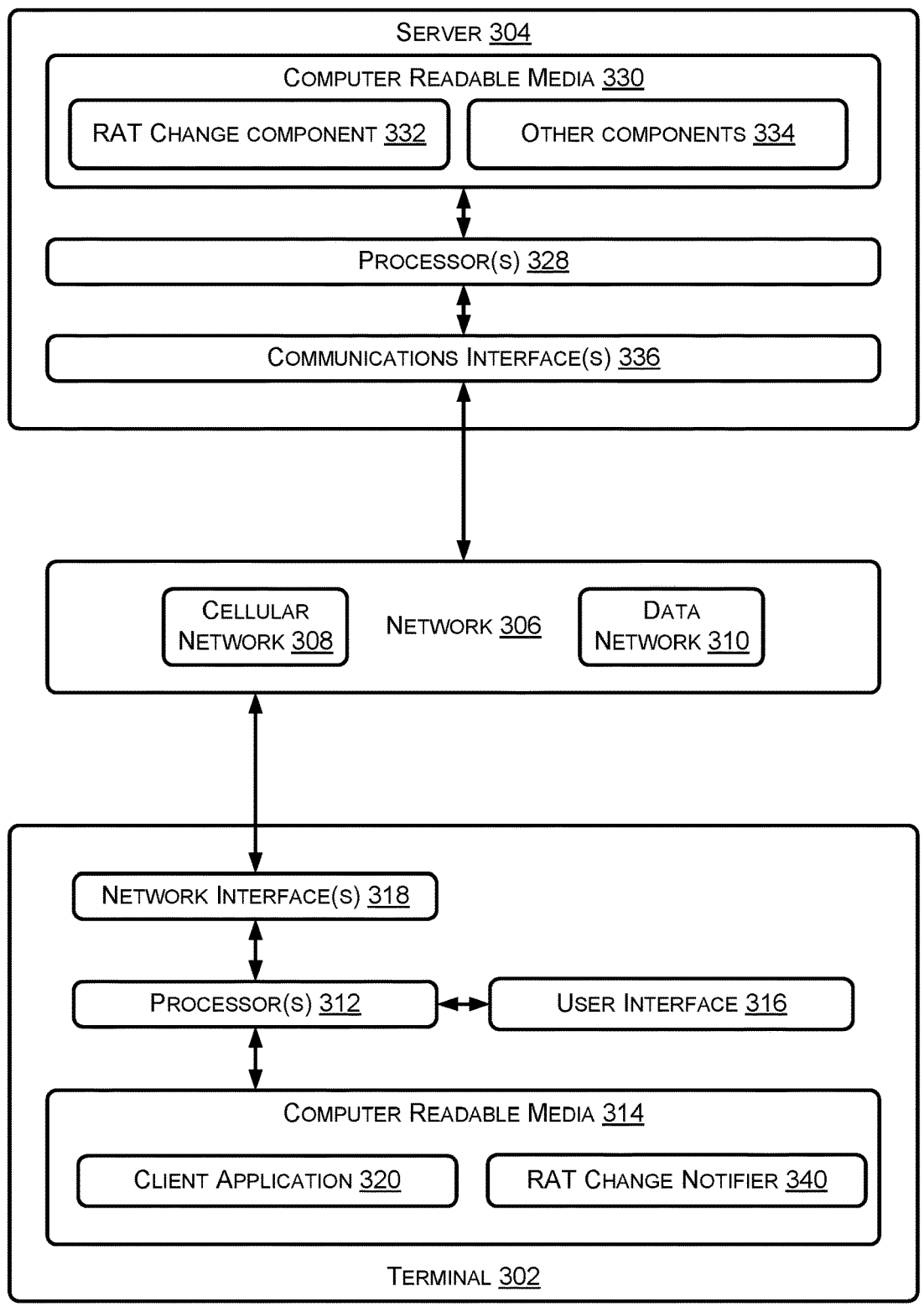
FIG. 3 is a block diagram illustrating a system that includes a change detection component for detecting changes in radio access technologies.

FIG. 3 is a block diagram illustrating a system 300 that includes a RAT change component 332 for detecting changes in radio access technologies according to some implementations. The system 300 includes a terminal 302, which can represent computing device 108A or 108B of FIG. 1, coupled to a server 304, via a network 306. The server 304 can represent one or more of the service nodes 106. The network 306 can represent, e.g., networks 102 or 112, or other networks of environment 100.

The network 306 can include one or more networks, such as a cellular network 308 and a data network 310. The network 306 can include one or more core network(s) connected to terminal(s) via one or more access network(s). Example access networks include LTE, Wi-Fi, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, Wi-Fi, or other networks.

The cellular network 308 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), Wi-Fi, and/or any future IP-based network technology or evolution of an existing IP-based network technology. Communications between the server 304 and terminals such as the terminal 302 can additionally or alternatively be performed using other technologies, such as wired (Plain Old Telephone Service, POTS, or PSTN lines), optical (e.g., Synchronous Optical NETwork, SONET) technologies, and the like.

The data network 310 can include various types of networks for transmitting and receiving data (e.g., data packets), including networks using technologies such as Wi-Fi, IEEE 802.15.1 ("BLUETOOTH"), Asynchronous Transfer Mode (ATM), WIMAX, and other network technologies, e.g., configured to transport IP packets. In some examples, the server 304 includes or is communicatively connected with an IWF or other device bridging networks, e.g., LTE, 3G, and POTS networks. In some examples, the server 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using VoIP or other technologies as well as data traffic, or the cellular network 308 can carry data packets using HSPA, LTE, or other technologies as well as voice traffic. Some cellular networks 308 carry both data and voice in a PS format. For example, many LTE networks carry voice traffic in data packets according to the VoLTE standard. Various examples herein provide origination and termination of, e.g., carrier-grade voice calls on, e.g., networks 306 using CS transports or mixed VoLTE/3G transports, or on terminals 302 including OEM handsets and non-OEM handsets.

The terminal 302 can be or include a wireless phone, a wired phone, a tablet computer, a laptop computer, a wristwatch, or other type of terminal. The terminal 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 314, such as memory (e.g., random access memory (RAM), solid state drives (SSDs), or the like), disk drives (e.g., platter-based hard drives), another type of computer-readable media, or any combination thereof. The CRM or other memory of terminal 302 can hold a datastore, e.g., an SQL or NoSQL database, a graph database, a BLOB, or another collection of data. The terminal 302 can further include a user interface (UI) 316, e.g., including an electronic display device, a speaker, a vibration unit, a touchscreen, or other devices for presenting information to a user and receiving commands from the user. The terminal 302 can further include one or more network interface(s) 318 configured to selectively communicate (wired or wirelessly) via the network 306, e.g., via an access network 112.

The CRM 314 can be used to store data and to store instructions that are executable by the processors 312 to perform various functions as described herein. The CRM 314 can store various types of instructions and data, such as an operating system, device drivers, etc. The processor-executable instructions can be executed by the processors 312 to perform the various functions described herein.

The CRM 314 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program components, or other data.

The CRM 314 can include processor-executable instructions of a client application 320 and a RAT change notifier 340. The client application 320, e.g., a native or other dialer, can permit a user to originate and terminate communication sessions associated with the terminal 302, e.g., a wireless phone. The client application 320 can additionally or alternatively include an SMS, RCS, or presence client, or a client of another telephony service offered by the server 304. The RAT change notifier 340 is configured to notify the client application 320 of a change in the RAT.

The CRM 314 can store information 322 identifying the terminal 302. The information 322 can include, e.g., an IMEI, an IMSI identifying the subscriber using terminal 302, or other information discussed above. The CRM 314 can additionally or alternatively store credentials (omitted for brevity) used for access, e.g., to IMS or RCS services.

The server 304 can include one or more processors 328 and one or more CRM 330. The CRM 330 can be used to store processor-executable instructions of a RAT change component 332, as well as one or more other components 334. In some configurations, the server 304 can be configured as a RAT service node 106C, or some other type of node. The processor-executable instructions can be executed by the one or more processors 328 to perform various functions described herein, e.g., with reference to FIGS. 4-5.

In some examples, server 304 can communicate with (e.g., is communicatively connectable with) terminal 302 or other devices via one or more communications interface(s) 336, e.g., network transceivers for wired or wireless networks, or memory interfaces. Example communications interface(s) 336 can include ETHERNET or FIBRE CHANNEL transceivers, Wi-Fi radios, or DDR memory-bus controllers (e.g., for DMA transfers to a network card installed in a physical server 304).

In some examples, processor 312 and, if required, CRM 314, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 328 and, if required, CRM 330.

Figure 4:
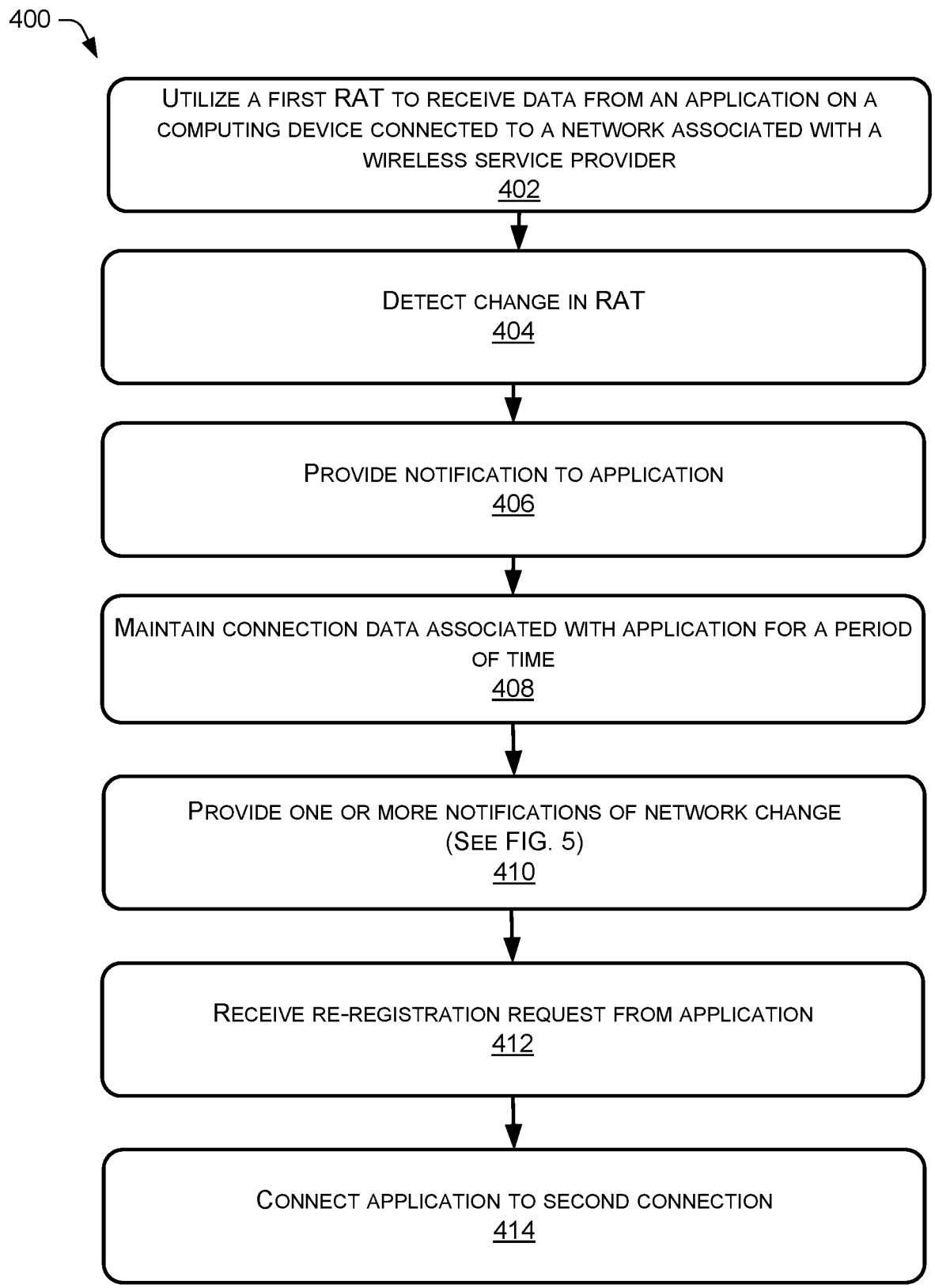
FIG. 4 is a flow diagram of an example process that includes notifying an application of a changes to a different radio access technology in a mobile network according to some implementations.
Figure 5:
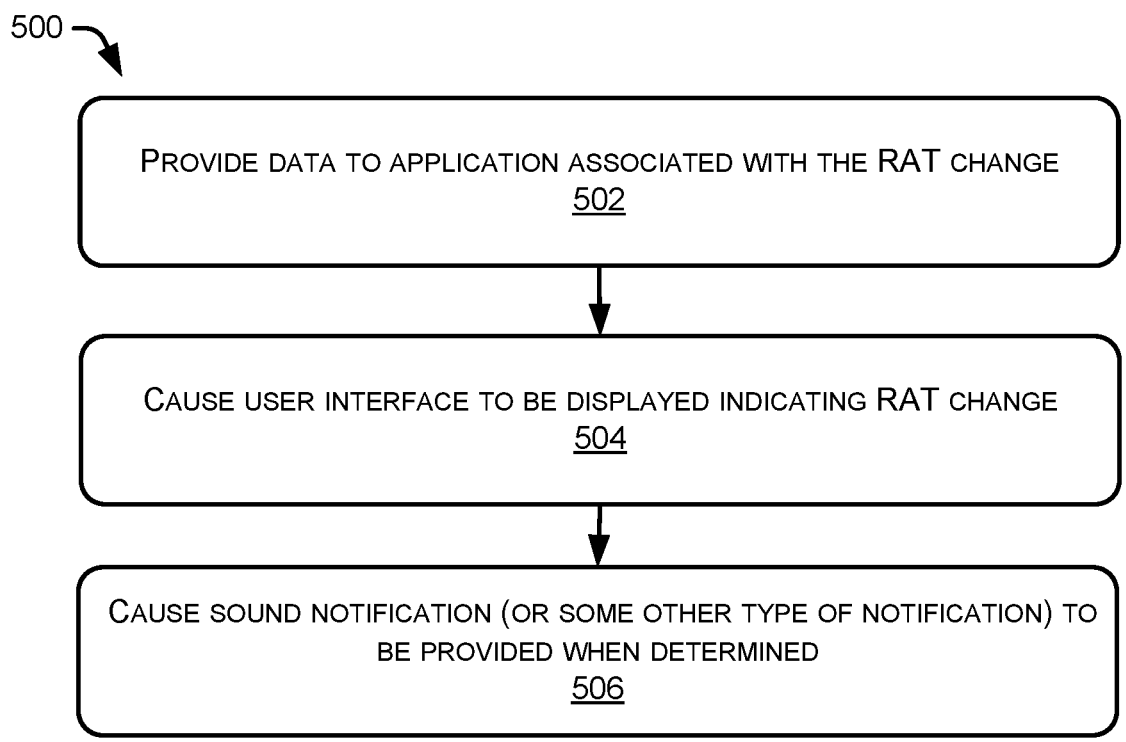
FIG. 5 is a flow diagram of an example process that includes providing one or more notifications in response to detecting a change in a radio access technology.

In the flow diagrams of FIGS. 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to the systems 100, and 300, as described above, although other models, frameworks, systems and environments may implement these processes.

FIG. 4 is a flow diagram of an example process 400 that includes notifying an application 110 of a change to a different radio access technology in a mobile network, according to some implementations. The process 400 may be performed by one or more computing devices, such as the computing devices described with regard to FIGS. 1 and 3.

At 402, a first RAT is used to receive data from an application 110 associated with a first computing device 108A. As discussed above, the computing device 108A may be connected to the network 102 associated with a wireless service provider using one of a plurality of RATs. For example, the first computing device may connect to the network using Wi-Fi, 4G-LTE, 5G, and the like.

At 404, the change in RAT is detected. As discussed above, a computing device 108A, may disconnect from one RAT by moving out of range of the RAT, manually disconnecting from the RAT, or losing connectivity to the RAT by some other way. In some configurations, the computing device 108A notifies one or more of the service nodes 106 of the change in the RAT.

At 406, the application 110 is notified of the change to the RAT. As discussed above, the RAT change notifier component 340 may notify the application 110 of the pending change or change to the RAT utilized by the computing device 108A.

At 408, the connection information to the application 408 is maintained by the network 102 for a period of time. As discussed above, instead of terminating any connections to the application upon the change, connection data associated with the registration of the application 110 via the first RAT is maintained for a configurable period of time such that the application 110 has time to re-register with the network 102 using the new RAT. Since the connection data is maintained, the network 102 is able to identify that the application 110 was connected to the network 102 before the change in the RAT.

At 410, one or more notifications are provided to the application 110 of the RAT change. As discussed in more detail below with regard to FIG. 5, a graphical user interface, audio notification, and/or some other type of notification may be provided (e.g., vibrating, flashing, . . . ) to indicate to the user of the computing device 108A of the change in RAT.

At 412, a re-registration request is received from the application 110. As discussed above, the application 110 is provided time to re-register to use the second connection established using the different RAT.

At 414, the application 110 is connected to the second RAT such that the application can continue the communication session with one or more other applications associated with one or more other computing devices.

FIG. 5 is a flow diagram of an example process 500 that includes providing one or more notifications in response to detecting a change in a radio access technology. The process 500 may be performed by one or more computing devices, such as the computing devices described with regard to FIGS. 1 and 3.

At 502, data is provided to the application 110 associated with the RAT change. As discussed above, in some configurations, the RAT notification component 340 notifies the application 110 of the RAT change.

At 504, a user interface indicating the RAT change is caused to be displayed. As discussed above, the RAT component 332 can provide data associated with a GUI, such as UIs 204A-204D as illustrated in FIG. 3, to the application 110. In other examples, the RAT notification component 340 can provide the data associated with the UI. The application 110, or some other application, on computing device 108A may utilize the data to display the user interface 202.

At 506, a sound notification, or some other type of notification, may be provided. As discussed above, a sound notification such as a beep(s), or some other auditory output can be output by the computing device 108A. In some configurations, some other type of notification can be provided, such as, but not limited to vibration, flashing, and the like.

The various techniques described above are assumed in the given examples to be implemented in the general context of computer-executable instructions or software, such as program components, that are stored in computer-readable storage and executed by the processor(s) of one or more computers or other devices such as those illustrated in the figures. Generally, program components include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method performed by one or more processors configured with specific instructions, the computer-implemented method comprising:
utilizing a first Radio Access Technology (RAT) to receive, via a first connection between a first computing device and a network associated with a wireless service provider, first data from an application associated with the first computing device;
causing the application to receive second data indicating a change from the first connection associated with the first RAT to a second connection associated with a second RAT;
maintaining, at the network associated with the wireless service provider, first connection data associated with the application for a period of time after providing the second data to the application;
receiving a registration request from the application, wherein the registration request requests the second connection associated with the second RAT; and
causing the application to utilize the second connection.

2. The computer-implemented method of claim 1, further comprising detecting the change in the first RAT, wherein the first RAT is a (4G) RAT and the second RAT is a (5G) RAT.

3. The computer-implemented method of claim 1, wherein the period of time is configurable.

4. The computer-implemented method of claim 1, wherein one or more of the first connection or the second connection at least partially utilizes peer to peer communication.

5. The computer-implemented method of claim 1, further comprising causing a notification to be provided by the application that indicates the change from the first RAT to the second RAT.

6. The computer-implemented method of claim 5, wherein causing the notification includes causing a graphical user interface to be displayed on the first computing device, the graphical user interface includes one or more user interface elements, wherein the one or more user interface elements include data that indicates the change from the first RAT to the second RAT.

7. The computer-implemented method of claim 5, wherein causing the notification includes causing sound data to be output at the first computing device, wherein the sound data indicates the change from the first RAT to the second RAT.

8. A non-transitory computer-readable media storing computer-executable instructions that, when executed, cause one or more processors of a computing device to perform acts comprising:
receiving, via a first connection associated with a first Radio Access Technology (RAT) at a network affiliated with a wireless service provider, first data from a first computing device;
causing second data to be provided to an application associated with the first computing device, wherein the second data indicates a change from the first connection associated with the first RAT to a second connection associated with a second RAT;

maintaining, at the network affiliated with the wireless service provider, first connection data associated with the first connection for a period of time after the change in the RAT;

receiving a registration request from the application, wherein the registration request is based at least in part on the change from the first connection to the second connection; and causing the first computing device to utilize the second connection.

9. The non-transitory computer-readable media of claim 8, wherein the acts further comprise detecting a disconnection from the first RAT.

10. The non-transitory computer-readable media of claim 8, wherein the period of time is configurable.

11. The non-transitory computer-readable media of claim 8, wherein one or more of the first connection or the second connection at least partially utilizes peer to peer communication.

12. The non-transitory computer-readable media of claim 8, wherein the acts further comprise causing a notification to be provided to the first computing device that indicates the change from the first RAT to the second RAT.

13. The non-transitory computer-readable media of claim 12, wherein causing the notification includes causing a graphical user interface to be displayed on the first computing device, the graphical user interface includes one or more user interface elements, wherein the one or more user interface elements include data that indicates the change to the second RAT.

14. The non-transitory computer-readable media of claim 12, wherein causing the notification includes causing sound data to be output on the first computing device, wherein the sound data indicates the change to the second RAT.

15. A system comprising:
one or more processors; and
one or more memories storing instructions that, when executed by the one or more processors, cause the system to perform acts including:
receiving, at a network affiliated with a wireless service provider, data from a first computing device;
delivering at least a portion of the data to a second computing device over a first connection associated with a first Radio Access Technology (RAT);
maintaining, at the network associated with the wireless service provider, first connection data associated with the first RAT and an application associated with the first computing device for a period of time after the change from the first RAT to the second RAT;
receiving a registration request from the application, wherein the registration request requests the second connection associated with the second RAT; and
causing the first computing device to utilize the second connection.

16. The system of claim 15, wherein the acts further comprise detecting a disconnection from the first RAT.

17. The system of claim 15, wherein the period of time is configurable.

18. The system of claim 15, wherein one or more of the first connection or the second connection at least partially utilizes peer to peer communication.

19. The system of claim 15, wherein the acts further comprise causing a notification to be provided by the application that indicates the change to the second RAT.

20. The system of claim 19, wherein causing the notification includes one or more of a causing a graphical user interface to be displayed on the first computing device or causing sound data to be output on the first computing device, the graphical user interface including one or more user interface elements.

* * * * *